United States Patent [19]

Brunet

[11] Patent Number: 4,500,142
[45] Date of Patent: Feb. 19, 1985

[54] MAGNETIC SUSPENSION DEVICE OF A ROTOR PLACED IN A SEALED ENCLOSURE

[75] Inventor: Maurice Brunet, St. Marcel, France

[73] Assignee: Societe Europeenne de Propulsion, Puteaux, France

[21] Appl. No.: 503,626

[22] Filed: Jun. 13, 1983

[30] Foreign Application Priority Data

Jun. 17, 1982 [FR] France .............................. 82 10600

[51] Int. Cl.³ .............................................. F16C 39/06
[52] U.S. Cl. ........................................ 308/10; 378/132
[58] Field of Search .......................... 308/10; 378/132; 310/86

[56] References Cited

U.S. PATENT DOCUMENTS

| | | | |
|---|---|---|---|
| 3,235,757 | 2/1966 | Weissman | 310/90 |
| 3,890,019 | 6/1975 | Boden | 308/10 |
| 3,938,913 | 2/1982 | Isenberg et al. | 417/356 |
| 4,121,143 | 10/1978 | Habermann | 308/10 |
| 4,180,946 | 1/1980 | Heijkenskjold | 308/10 |
| 4,357,555 | 11/1982 | Gerkema et al. | 378/135 |
| 4,405,286 | 9/1983 | Studer | 308/10 |

FOREIGN PATENT DOCUMENTS

| | | | |
|---|---|---|---|
| 0097590 | 1/1984 | European Pat. Off. | 308/10 |
| 2331613 | 1/1975 | Fed. Rep. of Germany | 308/10 |
| 1967086 | 6/1977 | Fed. Rep. of Germany | 308/10 |
| 1186527 | 8/1959 | France | 308/10 |
| 2165633 | 7/1973 | France . | |
| 2452782 | 3/1980 | France | 308/10 |
| 2456383 | 5/1980 | France . | |

Primary Examiner—R. Skudy
Attorney, Agent, or Firm—DeLio & Associates

[57] ABSTRACT

The invention relates to an active magnetic suspension device of a rotor placed in a sealed enclosure. Each active radial bearing comprises a stator composed of electromagnetic windings associated with a magnetic yoke which has end pole pieces placed at a short distance from the annular armature mounted on the rotor, the electromagnetic windings being arranged outside the sealed enclosure. Each stator magnetic yoke of laminar material is extended at the level of the end pole pieces by a terminal portion of non-laminar material, of small thickness, which constitutes directly a portion of the wall of the sealed enclosure and is attached by welding to the non-magnetic sealed wall portions which are not situated facing the annular armature.

9 Claims, 4 Drawing Figures

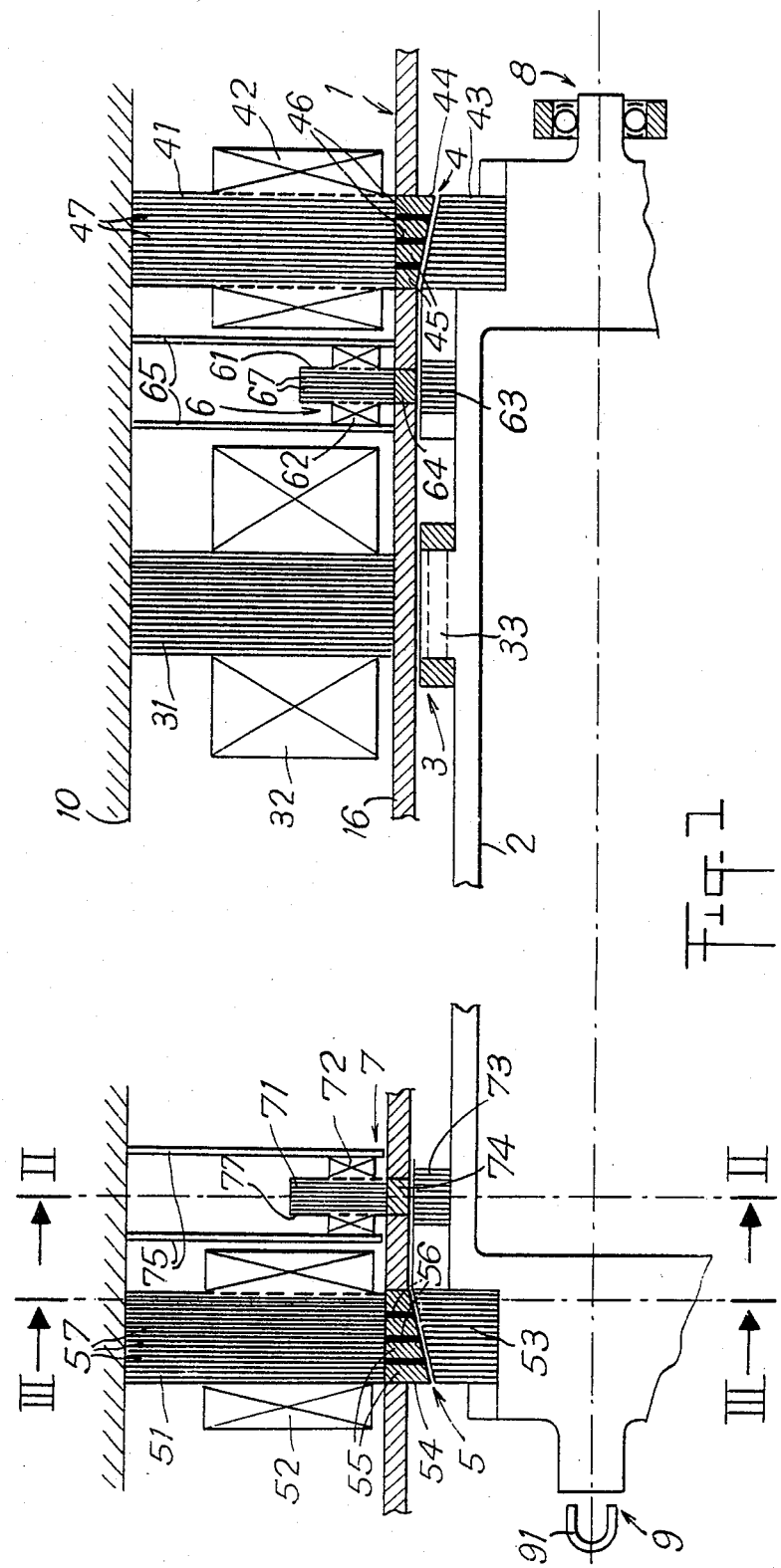

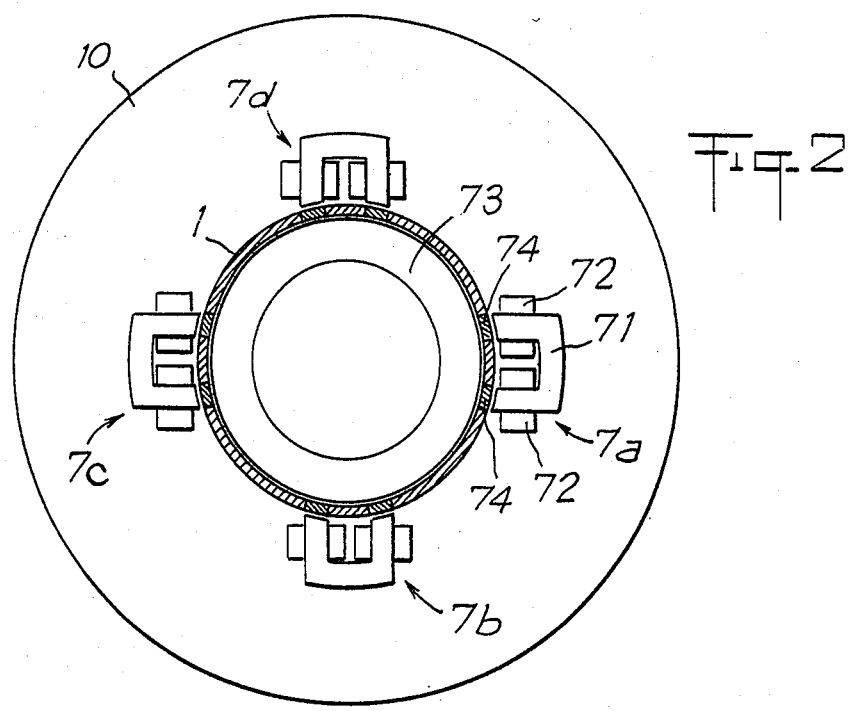
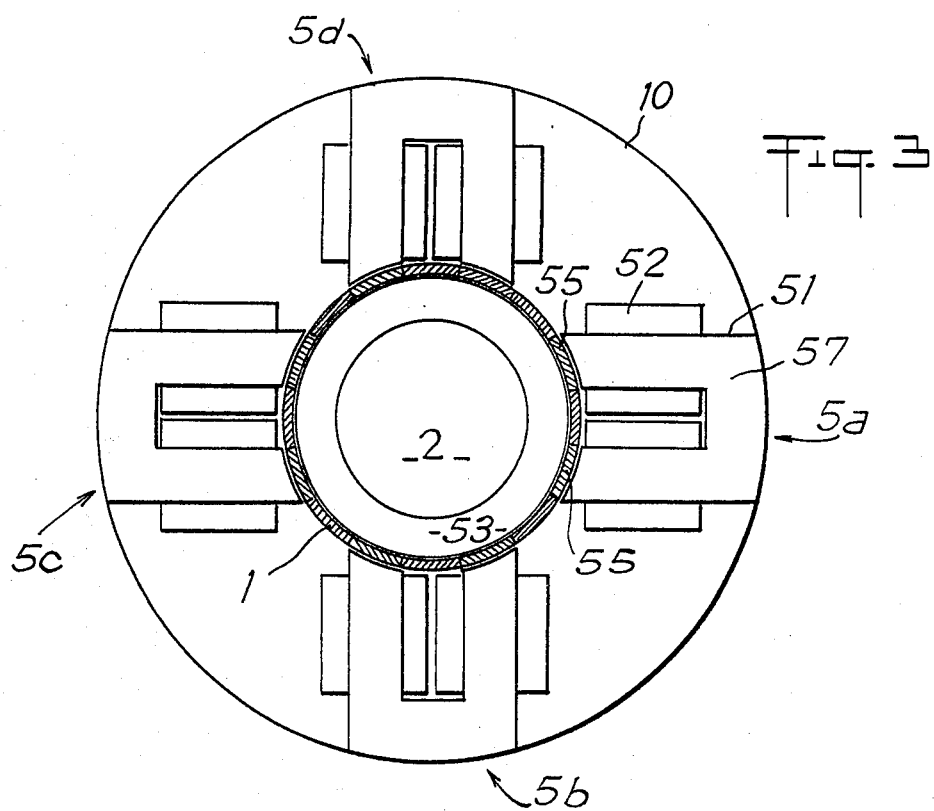

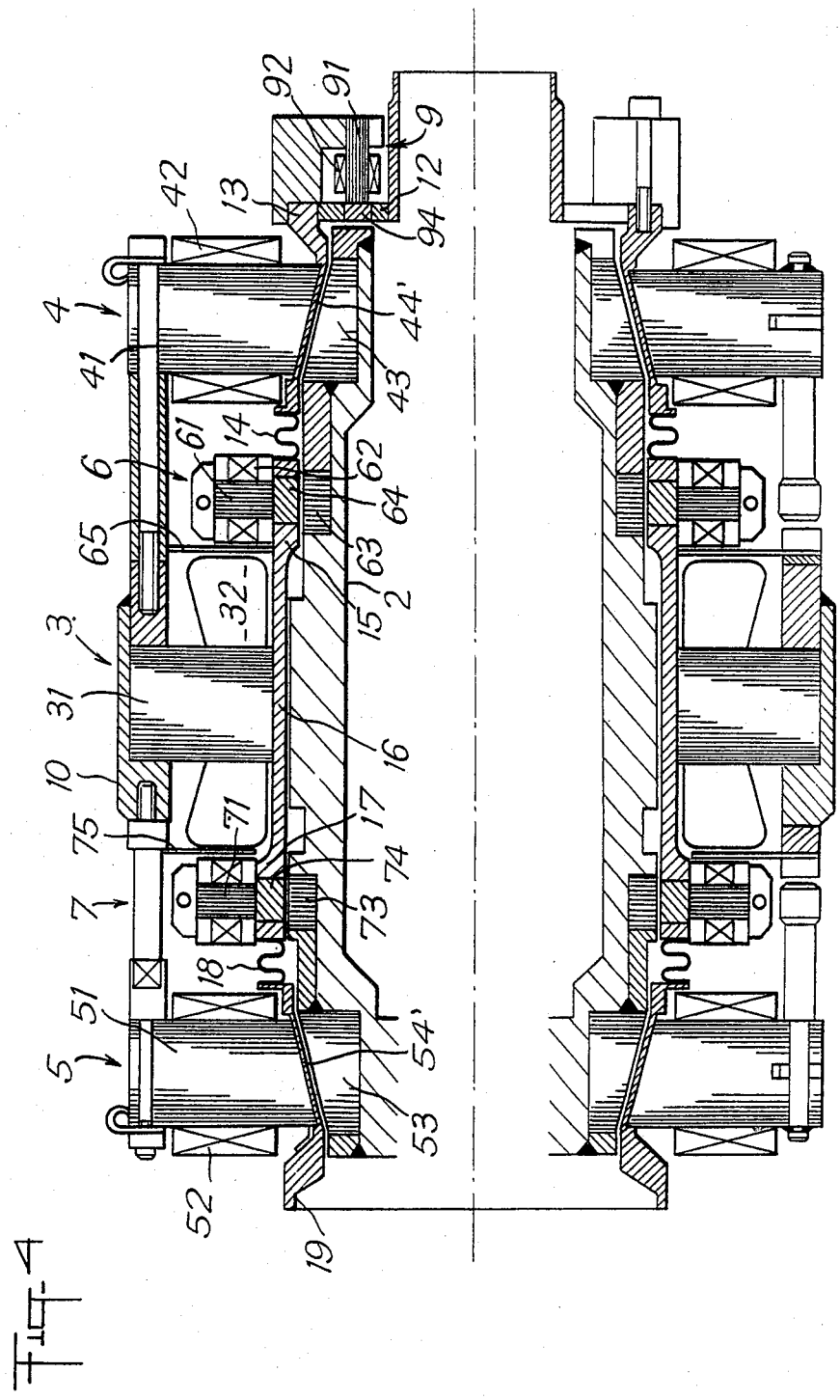

MAGNETIC SUSPENSION DEVICE OF A ROTOR PLACED IN A SEALED ENCLOSURE

The present invention relates to a magnetic suspension device of a rotor placed in a sealed enclosure, comprising at least two active radial electromagnetic bearings slaved by means of position detectors to support the rotor without contact, each bearing comprising an annular armature of laminated magnetic material mounted on a rotor and a stator composed of electromagnetic windings associated with a yoke of laminated magnetic material which has end pole pieces placed at a short distance from the annular armature, but without contact with the latter, and the electromagnetic windings being arranged outside of the sealed enclosure.

The use of electromagnetic bearings designed to support a unit which has to rotate at high speed inside a sealed enclosure, is already known, particularly through French Pat. No. 1,186,527.

According to the aforesaid French Patent, each of the electromagnetic bearings is constituted by a set of four identical electromagnets spaced regularly around the theoretical position of the axis of the shaft, each of the electromagnets comprising a winding and a yoke or armature having pole pieces positioned opposite the peripheral wall of a laminated rotor so as to exert a radial attraction on this rotor. Position detectors associated with an electronic system enable the energization of the bearing electromagnets to be regulated so as to bring back the axis of the rotor to its equilibrium position which thus constitutes a position of stable equilibrium.

In the arrangement described in French Pat. No. 1,186,527, the wall of the sealed enclosure is perfectly continuous and passes into the air-gaps of the magnetic couplings which exist between the rotary unit and the fixed members of the electromagnetic bearings.

If the continuous sealed wall is formed of a material neutral from the magnetic point of view, such as glass, the actual air-gap between the pole pieces of the magnetic bearing stators and the laminated rotors constituting the armatures of these bearings, cannot be reduced to sufficiently small values to permit satisfactory operation in practice, especially where a machine of relatively small size is concerned.

If on the other hand, the continuous sealed wall is formed entirely of a magnetic material, the latter constitutes a magnetic short-circuit throughout the length of the enclosure and disturbs the operation of the bearings, of the detectors and of the electric motor.

It has also been proposed, for example, in French patent application 2,452,782, to produce magnetic bearing stator yokes which go through the sealed wall of an X-ray tube. According to this method of construction, the electromagnetic windings are arranged outside the tube, whilst the pole pieces of the armature penetrate deeply inside the tube to form an air-gap within the latter. In this case, the electromagnetic windings are too distant from the air-gap and the magnetic losses are too high, so this construction is not satisfactory either.

In addition, with a machine which has to include a sealed enclosure, it is no longer possible to use conventional magnetic yokes of laminated material of which the pole pieces would come to be flush in the openings formed in the wall of the enclosure, since the thinness of the metal sheets of the magnetic yoke prevents the fastening of the latter to be made in sealed fashion.

GENERAL DESCRIPTION OF THE INVENTION

It is a particular object of the present invention to provide an electromagnetic suspension enabling the support without contact of a rotor placed in a sealed enclosure, with an air-gap of small width and low losses so as to be applicable to devices of relatively small size and to have a relatively limited consumption of energy.

According to the present invention there is provided a device of the above-described type in which, each stator magnetic yoke of laminated material is extended to the level of the end pole pieces by a terminal portion of non-laminated magnetic material, of small thickness, which constitutes directly a portion of the wall of the sealed enclosure and is attached by welding to the non-magnetic sealed wall portions which are not situated opposite the annular armature, the air-gap of an electromagnetic bearing being determined by said annular armature and the surface within the enclosure of said terminal portion forming part of the sealed wall.

According to a first embodiment of the invention, the terminal portions of the end pole pieces are constituted by a set of small solid pieces constructed of magnetic material of high resistivity, and of relative permeability higher than about 200, arranged parallel to the lines of the magnetic field, and molded in glass so as to be attached in sealed manner to glass portions of the wall 1 of the sealed enclosure (see FIG. 1).

The said small solid pieces have a width comprised between about 2 to 3 mm, whilst the laminated magnetic material of the yoke 41 is composed of metal sheets whose thickness is comprised between about 0.3 and 0.4 mm.

Said small solid pieces are separated from one another parallel to the magnetic field by a glass layer whose thickness is of the order of some tenths of a millimeter.

According to another embodiment of the invention, the terminal portions of the end pole pieces are constituted by a jacket formed by a metal sheet of magnetic material of high resistivity and of permeability higher than about 200, arranged perpendicularly to the lines of the magnetic field and attached by welding in sealed manner to portions of glass or of metal of the wall of the sealed enclosure.

The terminal portions have a thickness of the order of 0.3 to 0.5 mm and are constructed by means of a ferromagnetic alloy with a high content of noble metals such as invar or supra-anhyster.

According to an advantageous feature of the present invention, the position detectors are of the electromagnetic type and comprise an annular armature of laminated magnetic material mounted on the rotor and a stator composed of electromagnetic windings arrange outside the sealed enclosure and associated with an armature of a laminated magnetic material which has end pole pieces extended by a terminal portion of non-laminated magnetic material which constitutes directly a portion of the wall of the sealed enclosure and is attached by welding to contiguous wall portions of glass.

Preferably, the terminal portion of the position detectors is constituted by a ferrite rod or of sintered steel with isolated grains.

According to another particular feature of the invention the terminal portions constituted by a magnetic metal sheet are attached to glass wall portions through sealed wall sections which have undulations capable of absorbing differences of expansion of the wall sections of glass and of metal.

The device according to the invention may, in particular, be applied to the construction of the rotary anode shaft of an X-ray (not shown in the drawings) and in this case comprises in addition an asynchronous electric motor comprising a rotor fastened to the drive shaft of the anode and a stator situated outside the sealed enclosure of which the portion situated opposite the electric motor is of glass, and an axial detector of the position of the shaft, which axial detector comprises a stator composed of windings associated with an armature of laminated magnetic material whose end pole pieces are extended by a terminal portion of non-laminated magnetic material which constitutes directly a wall of the sealed enclosure and is attached by welding to the contiguous wall portions of glass.

In the case of such application, the electromagnetic bearings are advantageously of the conical type and the anode is preferably brought to ground potential (not shown in the drawings).

By way of example, the air gap between the terminal portions of the end pole pieces of the stator armatures of the electromagnetic bearing and the corresponding annular armatures is comprised between about 0.4 and 0.8 mm.

Other features and advantages of the invention will emerge from the description which follows of particular embodiments, given purely by way of non-limiting example, with reference to the accompanying drawings, in which:

FIG. 1 is a diagrammatic view in axial half section of a first embodiment of an electromagnetic suspension for a rotor placed inside a sealed enclosure, FIG. 2 is a view in section along the line II—II of FIG. 1 showing the structure of a radial position detector;

FIG. 3 is a sectional view along the line III—III of FIG. 1 showing the structure of a radial electromagnetic bearing, and FIG. 4 is a view in axial section of a second embodiment of an electromagnetic suspension, applied to the construction of a rotary anode in an X-ray tube.

In FIG. 1 is seen a rotor 2, which may be a rotary anode shaft of an X-ray tube, arranged inside a sealed enclosure 1 and supported without contact by means of electromagnetic bearings 4 and 5 whose stators are mounted on a base 10. An asynchronous electric motor 3 for driving the rotor 2 comprises an armature 33 composed of conducting copper bars extending parallel to the axis of the rotor 2 and housed at the periphery of the latter, and an inductor or stator comprising a core 31 formed from a stack of ferromagnetic metal sheets of small thickness and associated with energizing coils 32. The armature 33 fastened to the rotor 2 is arranged inside the enclosure 1 whilst the core 31 fast to the base 10 and the energizing coils 32 are arranged outside the enclosure 1 which, in its portion situated facing the motor 3 comprises a wall 16 formed of an insulating material such as glass. The end of the metal sheets of the core 31 comes into contact with the wall 16 whose thickness may be, for example, of the order of 1 to 2 mm. The free space between the wall 16 and the armature 33 may itself also consist of a separation of the order of 1 mm. With such magnitudes, the total air gap between the end of the core 31 and the armature 33 enables suitable operation of the drive motor 3.

In the case of a rotary anode shaft of an X-ray tube, the anode may preferably be brought to ground potential.

Detectors 6, 7 of the radial position of the rotor 2 are associated with the magnetic bearings 4 and 5 with slaving circuits, (not shown), to stabilize the position of the rotor 2 which is supported exclusively to electromagnetic means, the ball bearing 8 being present as an emergency bearing and having a transverse clearance slightly less than the smallest play existing between the rotor 2 on the one hand and the stators of the magnetic bearings 4, 5 of the motor and the radial detectors 6, 7 on the other hand. The electromagnetic bearings 4, 5 are of the biconical type and have air gap bounded by two frustoconic surfaces so that these bearings can exert a centering of the rotor both in the radial direction and in the axial direction, without an additional axial stop. An axial detector 9 of the position of the rotor cooperates with the radial detectors 6,7 to permit the slaving of the position of the rotor 2 by means of bearings 4 and 5.

If FIGS. 1 and 3 are now considered, it is seen that the magnetic bearings 4, 5 each comprise an annular armature 43, 53, of laminated ferromagnetic material mounted on the rotor 2, and a stator 41, 51 fixed to the base 10. Stator 41, 51 is constituted by four identical electromagnets such as 5a, 5b, 5c, 5d spaced regularly around the theoretical position of the axis of the rotor 2, each of the electromagnets comprising a winding 42,52 and a yoke 41, 51 of U shape defining pole pieces which come to face the corresponding annular armature 43, 53 to permit the closing of the lines of the magnetic flux, an air gap being formed between the pole surfaces of the end of the armature 41 of the stator and the annular armature 43, 53. Each yoke 41, 51 is formed of the laminated magnetic material and comprises a stack of thin metal plates 47, 57 perpendicular to the axis of the rotor 2. These thin metal sheets, for example, of soft iron, may have a thickness comprised between about 0.3 and 0.4 mm. The division of the yoke 41, 51 parallel to the magnetic field is designed conventionally to limit heavy eddy current losses. The windings 42,52 are arranged entirely outside the wall 1 of the sealed enclosure within which the rotor 2 is situated. This avoids the insulating coatings of the coils 42, 52 producing gas releases inside the sealed enclosure 1 and thus affecting the operation of the elements placed in this enclosure. A sealed enclosure may in fact be used to process toxic or corrosive products, but also to operate in a high vacuum of which the quality must not be affected by the presence of the magnetic bearings.

In order to limit magnetic losses, the pole pieces of the yoke 41, 51 should come as close as possible to the corresponding armature 43, 53 in order to form an air gap of small thickness. However a laminated core can with difficulty pass through a wall of which it is desired to preserve fluid-tightness. Consequently according to the invention, the pole pieces are extended by terminal portion 44, composed of solid elements 45, 55 of substantial thickness, of the order of 2 to 3 mm, formed of a non-laminated magnetic material whose resistivity and relative permeability $\mu$ are high. These solid elements 45, 55 may be formed, for example, of the 3% Fe-Si alloy. The solid elements 45, 55 arranged following the stack of laminated metal sheets 47 are molded in the glass which can thus constitute a thin insulating layer 46, 56 of some tenths of mm thickness in the direction of the axis of the rotor 2, between two solid elements 45, 55. The molding of the solid ferromagnetic elements 45 in the glass enables the continuity to be achieved in the fluid-tightness of the glass wall 1 whilst enabling the pole pieces of the yokes 41, 51 to be extended, without substantial increase in magnetic losses, even through the wall of the sealed enclosure and over a small distance inside the enclosure in order to define with the corresponding annular armature 43, 53 an air gap of reduced thickness. The terminal portion 44,54 of each pole can comprise 3 or 4 successive solid elements 45, 55 in the direction of the axis of the rotor but can also in certain cases be in one piece if the magnetic material used for this terminal portion has a sufficiently high magnetic permeability.

FIGS. 1 and 2 show an example of position detectors 6, 7 of the electromagnetic type which comprise an annular armature 63, 73 of laminated ferromagnetic material arranged on the rotor 2 and a stator composed of an armature 61,71 of laminated magnetic material mounted on a support 65, 75 fixed to the base 10, and windings 62,72. A detector 6, 7 may be composed of four electromagnets such as 7a, 7b, 7c, 7d (FIG. 2) distributed regularly around the axis of the rotor 2 defining four pairs of poles. The pole pieces 61, 71 constituted by conventional stacks of magnetic metal sheets 67, 77 come to be flush with the sealed wall 1 and are extended by the terminal portion 64, 74 of a non-laminated magnetic material which constitutes directly a portion of the sealed wall enclosure and is attached by welding to contiguous wall parts of glass. The terminal portion 64, 74 may be constituted preferably by a ferrite rod particularly adapted to operation of the detector at high frequencies of the order of some tens of kHz.

As in the case of magnetic bearings 4 and 5, the air gap of detectors 6 and 7 defined by the terminal portions 64, 74 and the corresponding armatures 63,73 may be very limited, for example, comprised between about 0.4 and 0.8 mm.

The second embodiment will now be described with reference to FIG. 4. The corresponding elements of the embodiment of FIG. 1 and of the embodiment of FIG. 4 bear the same numerical references.

The magnetic suspension device of FIG. 4 comprises two electromagnetic bearings 4 and 5 capable of supporting without contact a rotor 2 which comprises a support shaft for a rotary element such as an anode of an X-ray tube. The rotor 2 bears at its periphery annular armatures 43, 53 and 63, 73 of laminated magnetic material which cooperate with the stators outside of the enclosure of the magnetic bearings 4 and 5 and the position detectors 6 and 7 respectively. Safety ball bearings, not shown, may also be associated with the rotor 2 inside the sealed enclosure.

The configuration of the motor 3 and that of the detectors 6, 7 of the radial position of the rotor 2 are similar to those described with reference to FIG. 1. On the other hand, the terminal portions 44', 54' of the yokes 41, 51 of the magnetic bearing stators are different from the terminal portions 44, 54.

In the embodiment of FIG. 4 the end of the pole pieces of the laminated yokes 41, 51 is jacketed by means of sheet metal of little thickness (of the order of 0.3 to 0.5 mm) formed of a ferromagnetic material of high permeability and low resistivity such as invar or supraanhyster. The jacketing which extends beyond the pole pieces to form a sealed wall portion 13, 19 constitutes a magnetic short-circuit whose influence is established to be negligible taking into account the thinness of this sheet metal 44', 54' in its portion superposed on the poles of the yoke 41,51. Consequently, to the extent that the air-gap between the annular armature 43, 53 and the jacket forming the terminal portion 44', 54', can have an extremely small width, of the order of 0.4 to 0.8 mm, each electromagnetic bearing 4, 5 can preserve all its efficiency from the magnetic point of view whilst the fluid-tightness at the level of the stators 41,51 is guaranteed since no metal sheet 47, 57 emerges inside the sealed enclosure.

The wall portions 13, 19 of magnetic material are welded to sections of fluid-tight wall 14, 18 of a metal alloy which form corrugations intended to permit the absorption of differences in expansion between the sections of glass wall such as 15, 17 and sections of metal wall such as 13, 19.

A detector 9 (FIG. 4) or a pair of detectors 9 can be arranged facing a front portion of the rotor 2 to give data on the axial position of the rotor. The axial detector 9 can, like the radial detectors 6, 7 comprise a stator composed of a laminated yoke 91 associated with windings 92 and extended by a ferrite rod 94 inserted in the glass wall element 12.

It will be noted that, in the case of use for X-ray tubes, an active magnetic suspension of the rotary anode enables among others an anticipated control of the value of the current applied to the magnetic bearing windings 4, 5 in order to take into account particular forces due to the application of the high voltage (which creates disturbances due to the capacitive forces which appear in the tube) and among other things the deceleration due to end of travel stop on the stopping of the tube.

In addition, a suspension of electromagnetic type, which does not involve any contact between a rotor and the stators of the support bearings, enables, in the case of X-ray tubes, constant operation, for example, for a full day, whilst in the case of ball bearings, in order to avoid premature wear, it is necessary to restart the tube on each utilization operation, which introduces each time a delay time which is a nuisance to the practician.

It will be noted that in some cases the yokes 41, 51 may include a narrow additional air gap which is parallel to the rotor axis and is located between the yoke portions surrounded by the coils 42, 52 and the yoke portions which are adjacent to the jacket and constitute the terminal portions 44', 54'. The metal sheets constituting the yoke portions adjacent to the jacket 44', 54' may be fixed thereto e.g. by means of a glue, whereas the yoke portions surrounded by the coils 42, 52 can be made as a unitary assembly which is easily dismountable by sliding since these yoke portions no longer exhibit conical ends. Provided that the additional air gap be narrow enough, the properties of the magnetic bearings remain practically unaffected.

What is claimed is:

1. Magnetic suspension device for a rotor placed in a sealed enclosure, comprising at least two active radial electromagnetic bearings servocoupled by means of position detectors to support the rotor without contact, each bearing comprising an annular armature of laminated magnetic material mounted on the rotor and a stator composed of electromagnetic windings associated with a yoke of laminated magnetic material which has end pole pieces positioned at a short distance from the annular armature, but without contact with the latter, and the electromagnetic windings being all positioned outside the sealed enclosure, wherein the sealed enclosure includes fluid-tight walls at least some portion of which is formed of glass, each stator yoke of laminated material being extended to the level of the end pole pieces by a terminal portion of non-laminated magnetic material, of little thickness, constituted by a set of small solid pieces formed of a magnetic material of high resistivity and relative permeability greater than about 200, arranged parallel to the magnetic lines of force, and molded in glass so as to be attached in sealed manner to the glass portions of the wall of the sealed enclosure.

2. Device according to claim 1, wherein said small solid pieces have a width comprised between about 2 and 3 mm, whilst the laminated magnetic material of the yoke is composed of sheet metal whose thickness is comprised between about 0.3 and 0.4 mm, and wherein said small solid pieces are separated from one another parallel to the magnetic field by a glass layer whose thickness is of the order of some tenths of a millimeter.

3. Magnetic suspension device for a rotor placed in a sealed enclosure, comprising at least two active radial electromagnetic bearings servocoupled by means of position detectors to support the rotor without contact, each bearing comprising an annular armature of laminated magnetic material mounted on the rotor and a stator composed of electromagnetic windings associated with a yoke of laminated magnetic material which has end pole pieces positioned at a short distance from the annular armature, but without contact with the latter, and the electromagnetic windings being all positioned outside the sealed enclosure, wherein the sealed enclosure includes fluid-tight walls at least some portion of which is formed of non-magnetic material, each stator yoke of laminated material being extended to the level of the end pole pieces by a terminal portion of non-laminated magnetic material, of little thickness, constituted by a jacket formed by a metal sheet of a magnetic material of high resistivity and of permeability greater than about 200, arranged perpendicular to the lines of the magnetic field and joined by welding in fluid-tight manner to portions of the non-magnetic fluid-tight wall through sections of fluid-tight wall which have undulations capable of absorbing the differences in expansion of the sections of wall of non-magnetic material and metal, the air-gap of an electromagnetic bearing being determined by said annular armature and the surface within the enclosure of said terminal portion forming part of the fluid-tight wall.

4. Device according to claim 3, wherein the terminal portions constituted by a jacket formed by a metal sheet of a magnetic material have a thickness of the order of 0.3 to 0.5 mm and are constructed by means of a ferromagnetic alloy with an effective content of noble metals.

5. Device according to claim 3, applied to the construction of a rotary anode shaft of an X-ray tube, said device including an asynchronous electric motor comprising a rotor fastened to the drive shaft of the anode and a stator located outside the sealed enclosure of which the portion situated facing the electric motor is of non-magnetic material, wherein the electromagnetic bearings are of the conical type, comprising in addition an axial detector of the position of the shaft, which axial detector comprises a stator composed of windings associated with a yoke of laminated magnetic material of which the end pole parts are extended by a terminal portion of non-laminated magnetic material which constitutes directly a wall of the sealed enclosure and is attached by welding to the continuous wall portions of non-magnetic material, and wherein the anode is brought to ground potential.

6. Device according to claim 3, wherein the air-gap between the terminal portions of the end pole pieces of the yokes of the stators of the electromagnetic bearings and the corresponding annular armatures is comprised between about 0.4 and 0.8 mm.

7. Magnetic suspension device for a rotor placed in a sealed enclosure, comprising at least two active radial electromagnetic bearings servocoupled by means of position detectors to support the rotor without contact, each bearing comprising an annular armature of laminated magnetic material mounted on the rotor and a stator composed of electromagnetic windings associated with a yoke of laminated magnetic material which has end pole pieces positioned at a short distance from the annular armature, but without contact with the latter, and the electromagnetic windings being all positioned outside the sealed enclosure, wherein the sealed enclosure includes fluid-tight walls at least some portion of which is formed of non-magnetic material, each stator yoke of laminated material being extended to the level of the end pole pieces by a terminal portion of non-laminated magnetic material, of little thickness, which constitutes directly a portion of the wall of the sealed enclosure and is attached by welding to the portions of non-magnetic fluid-tight wall which are not situated opposite the annular armature, the air-gap of an electromagnetic bearing being determined by said annular armature and the surface within the enclosure of said terminal portion forming part of the fluid-tight wall, said position detectors being of the electromagnetic type and comprising an annular armature of laminated magnetic material mounted on the rotor and a stator composed of electromagnetic windings arranged outside the sealed enclosure and associated with a yoke of laminated magnetic material which has end pole pieces extended by a terminal portion of ferrite rod which constitutes directly a portion of the wall of the sealed enclosure and is attached by welding to the continuous wall portions of non-magnetic material.

8. Device according to claim 7, applied to the construction of a rotary anode shaft of an X-ray tube, said device including an asynchronous electric motor comprising a rotor fastened to the drive shaft of the anode and a stator located outside the sealed enclosure of which the portion situated facing the electric motor is of non-magnetic material, wherein the electromagnetic bearings are of the conical type, comprising in addition an axial detector of the position of the shaft, which axial detector comprises a stator composed of windings associated with a yoke of laminated magnetic material of which the end pole parts are extended by a terminal portion of non-laminated magnetic material which constitutes directly a wall of the sealed enclosure and is attached by welding to the continuous wall portion of non-magnetic material, and wherein the anode is brought to ground potential.

9. Device according to claim 7, wherein the air-gap between the terminal portions of the end pole pieces of the yokes of the stators of the electromagnetic bearings and the corresponding annular armatures is comprised between about 0.4 and 0.8 mm.

* * * * *

UNITED STATES PATENT AND TRADEMARK OFFICE
CERTIFICATE OF CORRECTION

PATENT NO. : 4,500,142
DATED : February 19, 1985
INVENTOR(S) : Maurice Brunet

It is certified that error appears in the above-identified patent and that said Letters Patent are hereby corrected as shown below:

Column 3, line 5, the word "tube" should appear after the word "x-ray"

Column 4, line 7, delete "to" and substitute -- by --

Signed and Sealed this

Thirtieth Day of July 1985

[SEAL]

Attest:

DONALD J. QUIGG

Attesting Officer    Acting Commissioner of Patents and Trademarks